(12) United States Patent
Burkholz et al.

(10) Patent No.: US 12,544,543 B2
(45) Date of Patent: Feb. 10, 2026

(54) INTRAVENOUS CATHETER DEVICE HAVING A GUIDEWIRE FOR ACTIVELY REPOSITIONING A CATHETER TIP

(71) Applicant: Becton, Dickinson and Company, Franklin Lakes, NJ (US)

(72) Inventors: Jonathan Karl Burkholz, Salt Lake City, UT (US); Justin G. Hortin, Farmington, UT (US); Lisa Bailey, Salt Lake City, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 772 days.

(21) Appl. No.: 17/825,474

(22) Filed: May 26, 2022

(65) Prior Publication Data

US 2022/0379097 A1 Dec. 1, 2022

Related U.S. Application Data

(60) Provisional application No. 63/194,050, filed on May 27, 2021.

(51) Int. Cl.
| | |
|---|---|
| *A61B 5/00* | (2006.01) |
| *A61B 5/15* | (2006.01) |
| *A61M 25/09* | (2006.01) |

(52) U.S. Cl.
CPC . *A61M 25/09041* (2013.01); *A61B 5/150992* (2013.01); *A61M 2025/09083* (2013.01); *A61M 2025/09116* (2013.01)

(58) Field of Classification Search
CPC .. A61M 25/09041; A61M 2025/09083; A61M 2025/09116; A61M 25/0147; A61M 25/0113; A61M 25/0606; A61M 25/09; A61M 5/158; A61M 25/0043; A61M 25/0097; A61M 2005/1586; A61M 2005/1587; A61M 2005/1588; A61M 2025/0019; A61M 2025/09066; A61M 2025/09175; A61M 25/0133; A61B 5/150992; A61B 5/15003; A61B 5/150221; A61B 5/154; A61B 5/153
See application file for complete search history.

(56) References Cited

U.S. PATENT DOCUMENTS

| | | | |
|---|---|---|---|
| 8,998,845 B2 | 4/2015 | Reed | |
| 10,898,689 B2 | 1/2021 | Holt | |
| 11,844,912 B2 * | 12/2023 | Alsheikh | A61B 34/20 |
| 12,213,729 B2 * | 2/2025 | Katoh | A61B 8/12 |
| 2003/0114832 A1 | 6/2003 | Kohler et al. | |

(Continued)

FOREIGN PATENT DOCUMENTS

| | | |
|---|---|---|
| EP | 3238771 B1 | 10/2018 |
| WO | 2004089456 A1 | 10/2004 |
| WO | 2020097161 A2 | 5/2020 |

*Primary Examiner* — May A Abouelela
(74) *Attorney, Agent, or Firm* — The Webb Law Firm

(57) ABSTRACT

An intravenous catheter device may include a guidewire for actively repositioning the catheter tip. A guidewire assembly may be configured to enable a clinician to actively reposition the catheter tip by moving proximal ends of segments of the guidewire. By repositioning the catheter tip, the guidewire assembly may facilitate the collection of a blood sample or the injection of a fluid through the catheter even in instances when the catheter tip has become occluded.

12 Claims, 11 Drawing Sheets

(56) References Cited

U.S. PATENT DOCUMENTS

| | | | |
|---|---|---|---|
| 2005/0010095 | A1 | 1/2005 | Stewart et al. |
| 2006/0100544 | A1 | 5/2006 | Ayala et al. |
| 2007/0078455 | A1 | 4/2007 | Rashidi |
| 2018/0214216 | A1* | 8/2018 | Sema .................... A61M 25/09 |
| 2018/0264237 | A1* | 9/2018 | Palushi ................ A61B 5/6851 |
| 2018/0311472 | A1* | 11/2018 | Matlock .......... A61M 25/09041 |
| 2019/0111238 | A1 | 4/2019 | Schultz et al. |
| 2019/0125373 | A1* | 5/2019 | Brenizer ................ A61B 17/22 |
| 2019/0335977 | A1 | 11/2019 | Yamada et al. |
| 2020/0022777 | A1* | 1/2020 | Rama .................... A61M 25/00 |
| 2020/0155803 | A1* | 5/2020 | Caton ................ A61M 25/0113 |
| 2020/0230371 | A1* | 7/2020 | Klausen ............ A61M 25/0108 |
| 2021/0252254 | A1* | 8/2021 | Jones ...................... A61F 2/954 |
| 2021/0330370 | A1* | 10/2021 | Macaraeg ............ A61B 18/082 |
| 2022/0040454 | A1* | 2/2022 | Hamm .............. A61M 25/0158 |
| 2022/0062644 | A1* | 3/2022 | Bornzin ................ A61N 1/371 |
| 2022/0211981 | A1* | 7/2022 | Darbellay .......... A61M 25/0136 |
| 2022/0354595 | A1* | 11/2022 | Yi .......................... A61M 25/09 |

* cited by examiner

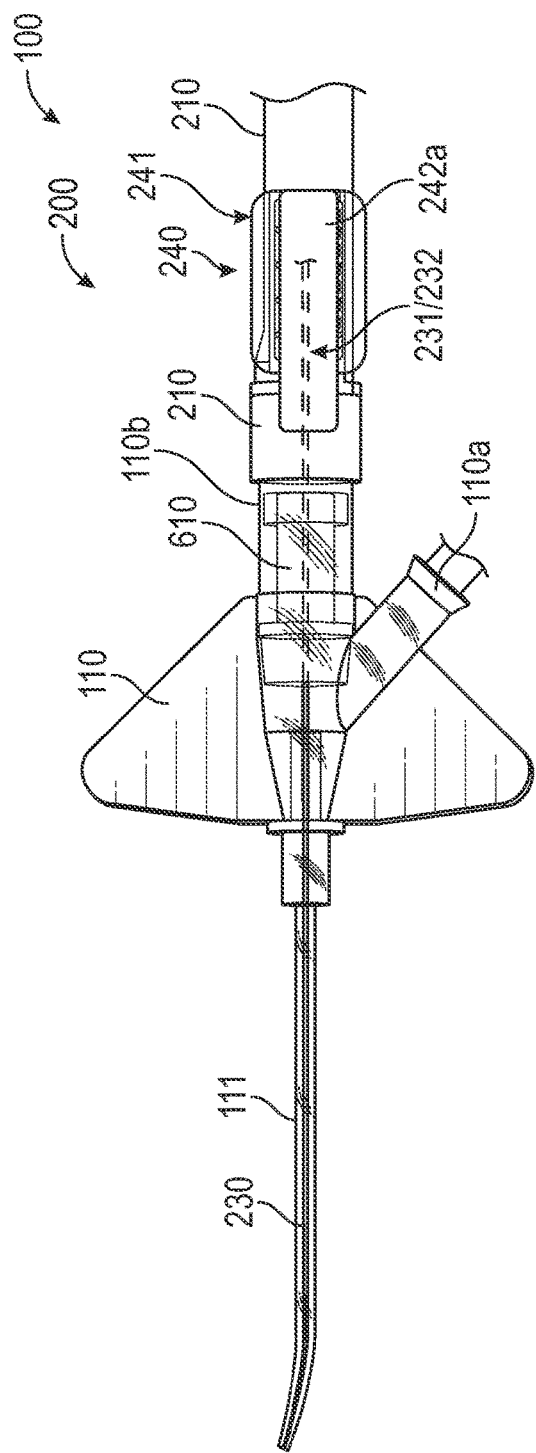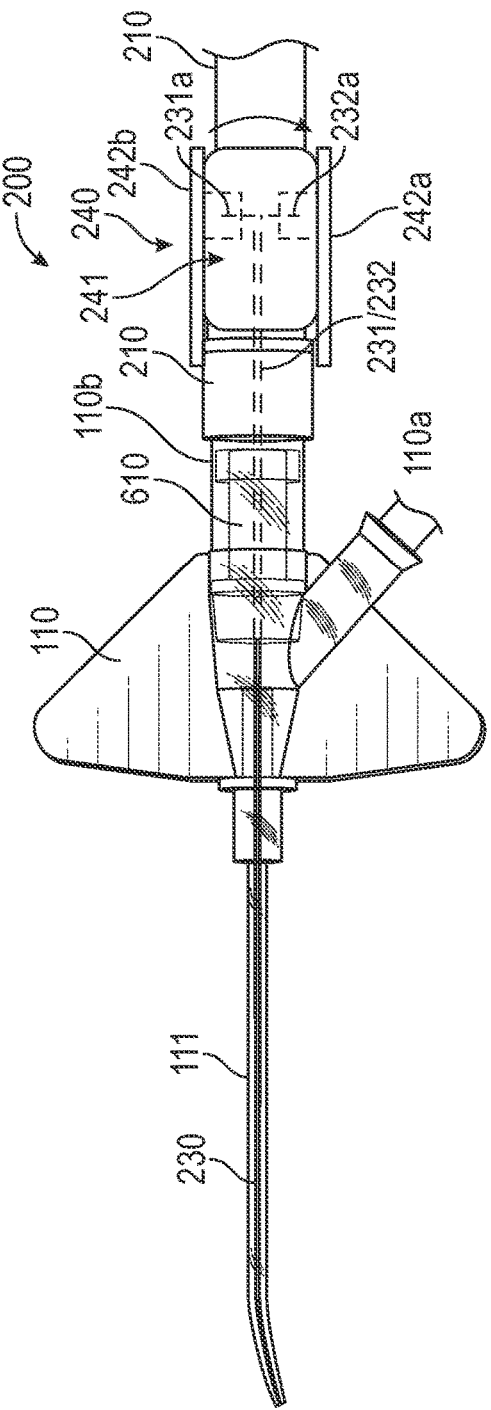

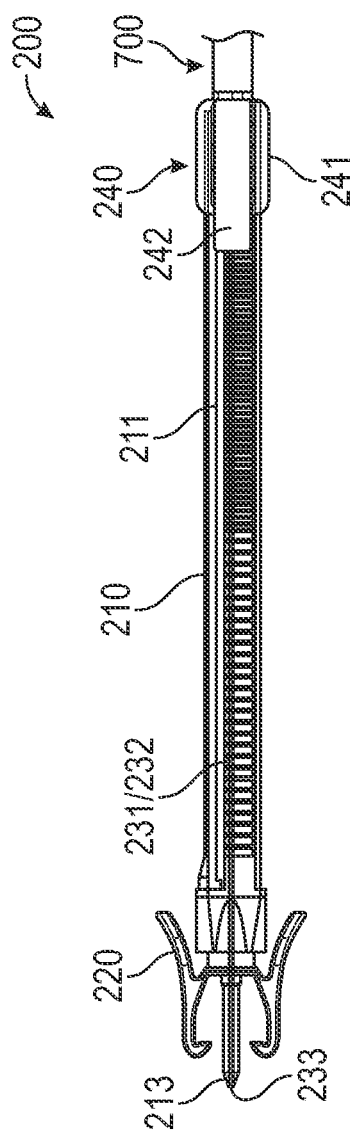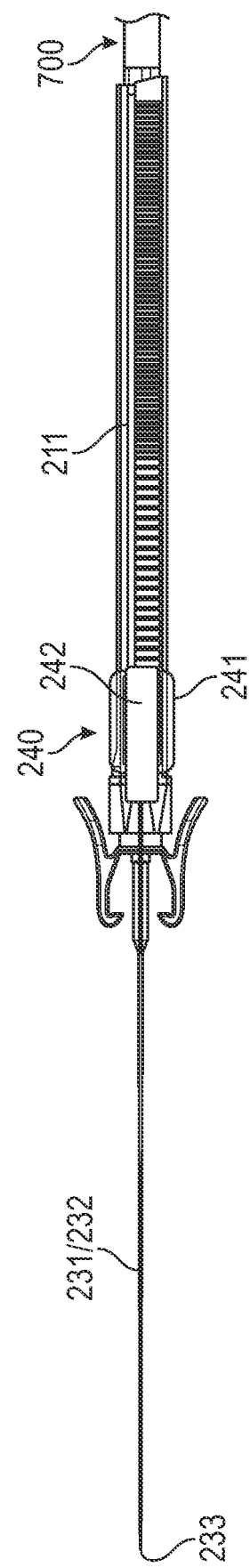
FIG. 7A
FIG. 7B

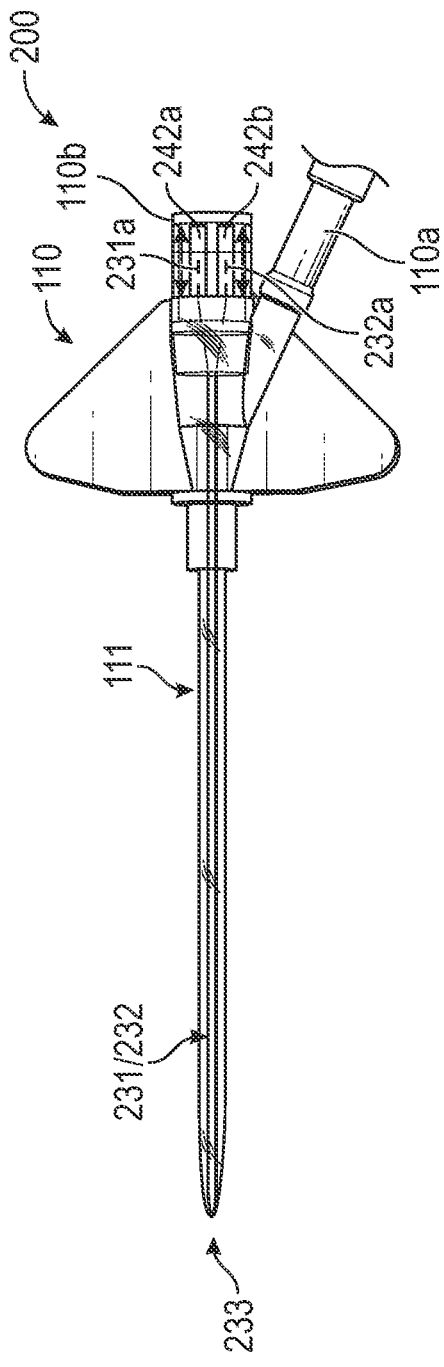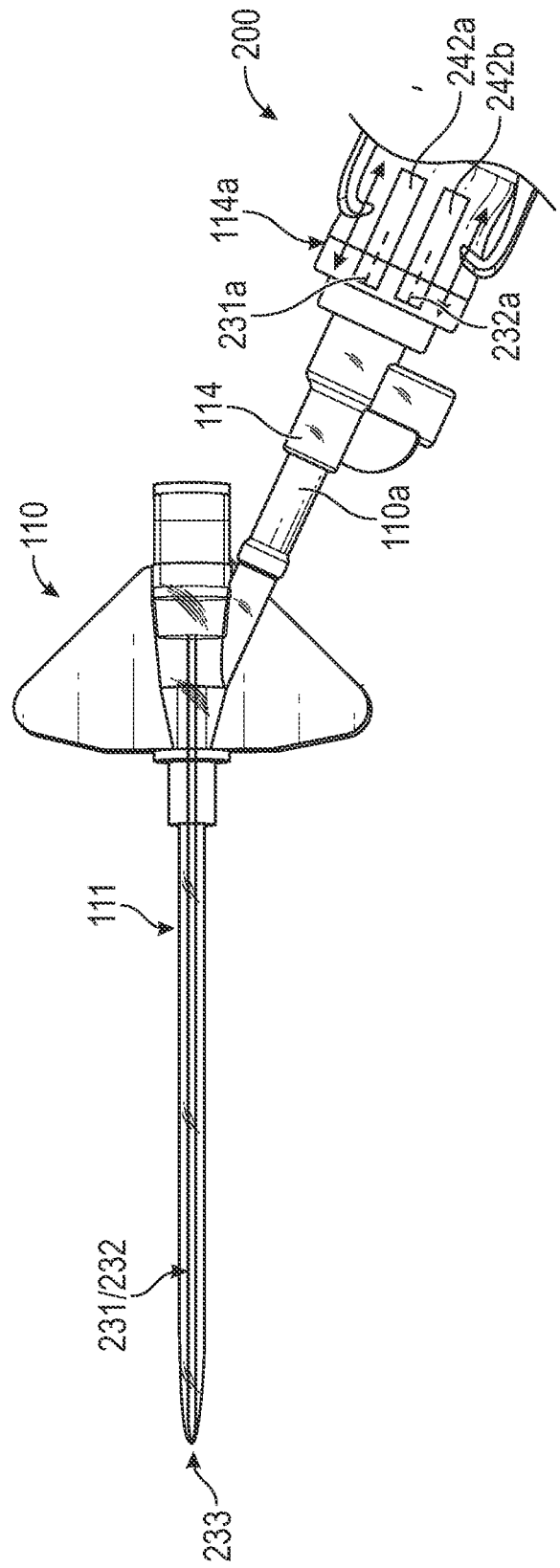

INTRAVENOUS CATHETER DEVICE HAVING A GUIDEWIRE FOR ACTIVELY REPOSITIONING A CATHETER TIP

CROSS-REFERENCE TO RELATED APPLICATION

The present application claims priority to U.S. Provisional Application Ser. No. 63/194,050, entitled "Intravenous Catheter Device Having a Guidewire for Actively Repositioning a Catheter Tip", filed May 27, 2021, the entire disclosure of which is hereby incorporated by reference in its entirety.

BACKGROUND OF THE INVENTION

Intravenous (IV) catheter devices are commonly used for a variety of infusion therapies. For example, an IV catheter device may be used for infusing fluids, such as normal saline solution, various medicaments, and total parenteral nutrition, into a patient. IV catheter devices may also be used for withdrawing blood from the patient.

A common type of IV catheter device includes a catheter that is "over-the-needle." As its name implies, the catheter that is over-the-needle may be mounted over a needle having a sharp distal tip. The catheter and the needle may be assembled so that the distal tip of the needle extends beyond the distal tip of the catheter with the bevel of the needle facing up away from skin of the patient. The catheter and the needle are generally inserted at a shallow angle through the skin into the vasculature of the patient. Once the catheter is positioned within the vasculature, it may become occluded such as when a thrombus forms around the catheter's distal opening or the distal opening is positioned against a vessel wall.

When IV catheter devices are not properly maintained within the patient's vasculature, they are likely to become occluded. Once an IV catheter device is occluded, it may no longer be possible to use the IV catheter device to infuse fluids or withdraw blood. In such cases, the IV catheter device may be replaced. Yet, replacing an IV catheter device is burdensome for the patient and increases costs. To address such issues, some devices have been developed that may be inserted through the indwelling catheter of the IV catheter device to remove the occlusion. For example, some devices employ rigid tubing that may be inserted through the catheter and distally beyond the catheter's distal opening. With the rigid tubing inserted in this manner, such devices may obtain a blood sample through the rigid tubing even if the catheter had become occluded. In other words, the rigid tubing is employed to physically pass through any occlusion that may have formed in or around the catheter's distal opening and forms a separate fluid pathway from the catheter for collecting the blood sample. When used in this manner, the rigid tubing may become occluded as the tubing is advanced through the occlusion or thrombus.

The subject matter claimed herein is not limited to embodiments that solve any disadvantages or that operate only in environments such as those described above. Rather, this background is only provided to illustrate one example technology area where some implementations described herein may be practiced.

SUMMARY OF THE INVENTION

The present disclosure relates generally to an intravenous catheter device having a guidewire for actively repositioning the catheter tip. A guidewire assembly may be configured to enable a clinician to actively reposition the catheter tip by moving proximal ends of segments of the guidewire. By repositioning the catheter tip, the guidewire assembly may facilitate the collection of a blood sample or the injection of a fluid through the catheter even in instances when the catheter tip has become occluded.

In some embodiments, a guidewire assembly may include a guidewire housing, a guidewire actuator configured to slide within the guidewire housing and a guidewire having a first segment and a second segment. The guidewire actuator may be coupled to a proximal end of the first segment and to a proximal end of the second segment such that the guidewire slides when the guidewire actuator is slid within the guidewire housing. The guidewire actuator may further be configured to cause relative movement between the proximal end of the first segment and the proximal end of the second segment to thereby cause a distal end of the guidewire to reposition.

In some embodiments, a single wire may form the first segment and the second segment or multiple wires may form the first segment and the second segment. In some embodiments, the guidewire actuator may include a first tab that is coupled to the proximal end of the first segment. The first tab may move relative to a main body of the guidewire actuator to cause the relative movement between the proximal end of the first segment and the proximal end of the second segment. In some embodiments, the first tab may move relative to the main body by sliding along the main body. In some embodiments, the guidewire actuator may also include a second tab that is coupled to the proximal end of the second segment. The second tab may move relative to the main body of the guidewire actuator to cause the relative movement between the proximal end of the first segment and the proximal end of the second segment. In some embodiments, the first tab and the second tab may move relative to the main body by sliding along the main body.

In some embodiments, the guidewire actuator may include a main body and the proximal end of the first segment and the proximal end of the second segment may be coupled to the main body. The main body may rotate to cause the relative movement between the proximal end of the first segment and the proximal end of the second segment. In some embodiments, the first segment and the second segment may wrap around the main body in opposite directions.

In some embodiments, the guidewire may include a ring that maintains a spacing between the first and second segments. In some embodiments, the guidewire may include a bend that is spaced from the distal end. In some embodiments, the guidewire may include a dome-shaped distal end.

In some embodiments, the first segment may be a core wire and the second segment may be a coil that extends around the core wire. In some embodiments, a proximal end of the first segment may be coupled to a tab of the guidewire actuator, and the guidewire actuator may further include a spring that biases the tab in a proximal direction.

In some embodiments, an intravenous catheter device may include a catheter adapter from which a catheter extends and a guidewire assembly that is coupled to the catheter adapter. The guidewire assembly may include a guidewire housing, a guidewire actuator configured to slide within the guidewire housing and a guidewire having a first segment and a second segment. The guidewire actuator may be coupled to a proximal end of the first segment and to a proximal end of the second segment such that the guidewire slides when the guidewire actuator is slid within the guidewire housing to thereby enable a distal end of the guidewire to be positioned at or near a distal end of the catheter. The guidewire actuator may further be configured to cause relative movement between the proximal end of the first segment and the proximal end of the second segment to thereby cause a distal end of the guidewire to reposition to thereby reposition the distal end of the catheter. In some embodiments, the guidewire actuator may rotate relative to the guidewire housing and the rotation may also cause the distal end of the catheter to reposition. In some embodiments, the guidewire assembly may form a fluid pathway for collecting a blood sample through the catheter.

In some embodiments, the guidewire actuator may include a first tab that is coupled to the proximal end of the first segment. The first tab may move relative to a main body of the guidewire actuator to cause the relative movement between the proximal end of the first segment and the proximal end of the second segment.

In some embodiments, the guidewire actuator may include a second tab that is coupled to the proximal end of the second segment. The second tab may move relative to the main body of the guidewire actuator to cause the relative movement between the proximal end of the first segment and the proximal end of the second segment.

In some embodiments, the guidewire actuator may include a main body and the proximal end of the first segment and the proximal end of the second segment may be coupled to the main body. The main body may rotate to cause the relative movement between the proximal end of the first segment and the proximal end of the second segment.

In some embodiments, a method for repositioning a distal end of an intravenous catheter may include advancing a guidewire to a distal end of a catheter while the catheter is positioned intravenously. The guidewire may include a first segment and second segment. In some embodiments, the method may also include, while a distal end of the guidewire is positioned at or near the distal end of the catheter, moving a proximal end of the first segment relative to a proximal end of the second segment to thereby cause the distal end of the guidewire to reposition. The repositioning of the distal end of the guidewire may cause the distal end of the catheter to also reposition. In some embodiments, moving the proximal end of the first segment relative to the proximal end of the second segment may include moving the proximal end of the first segment distally or proximally, moving the proximal end of the second segment distally or proximally, moving both the proximal end of the first segment and the proximal end of the second segment in opposing proximal and distal directions or rotating the proximal end of the first segment and the proximal end of the second segment around an axis.

It is to be understood that both the foregoing general description and the following detailed description are examples and explanatory and are not restrictive of the invention, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE DRAWINGS

Example embodiments will be described and explained with additional specificity and detail through the use of the accompanying drawings in which:

FIG. 6A is a partial front view of an IV catheter device that include a guidewire assembly in accordance with the present invention;

FIG. 6B is a partial front view of an IV catheter device that include a guidewire assembly in accordance with the present invention;

FIG. 7A is a partial side view of a guidewire assembly that is configured in accordance with the present invention;

FIG. 7B is a partial side view of a guidewire assembly that is configured in accordance with the present invention;

FIG. 9A is a partial front view of an IV catheter device including a guidewire assembly configured in accordance with the present invention; and FIG. 9B is a partial front view of an IV catheter device including a guidewire assembly configured in accordance with the present invention.

DETAILED DESCRIPTION OF INVENTION

An IV catheter device that may be employed in some embodiments may include a catheter adapter from which a catheter distally extends and one or more ports or connectors for attaching other devices to the catheter adapter. Such devices may be attached to the catheter adapter before, during or after insertion of the catheter into a patient's vasculature and may include a needle assembly, a blood collection set, an infusion assembly, any embodiment of a guidewire assembly described herein, etc. In some embodiments, a guidewire assembly may be integrated into an IV catheter device as opposed to being selectively connected to the IV catheter device. Accordingly, embodiments of the present disclosure should not be limited to any particular configuration of an IV catheter device or to the specific examples of IV catheter devices used herein.

Figure 1:
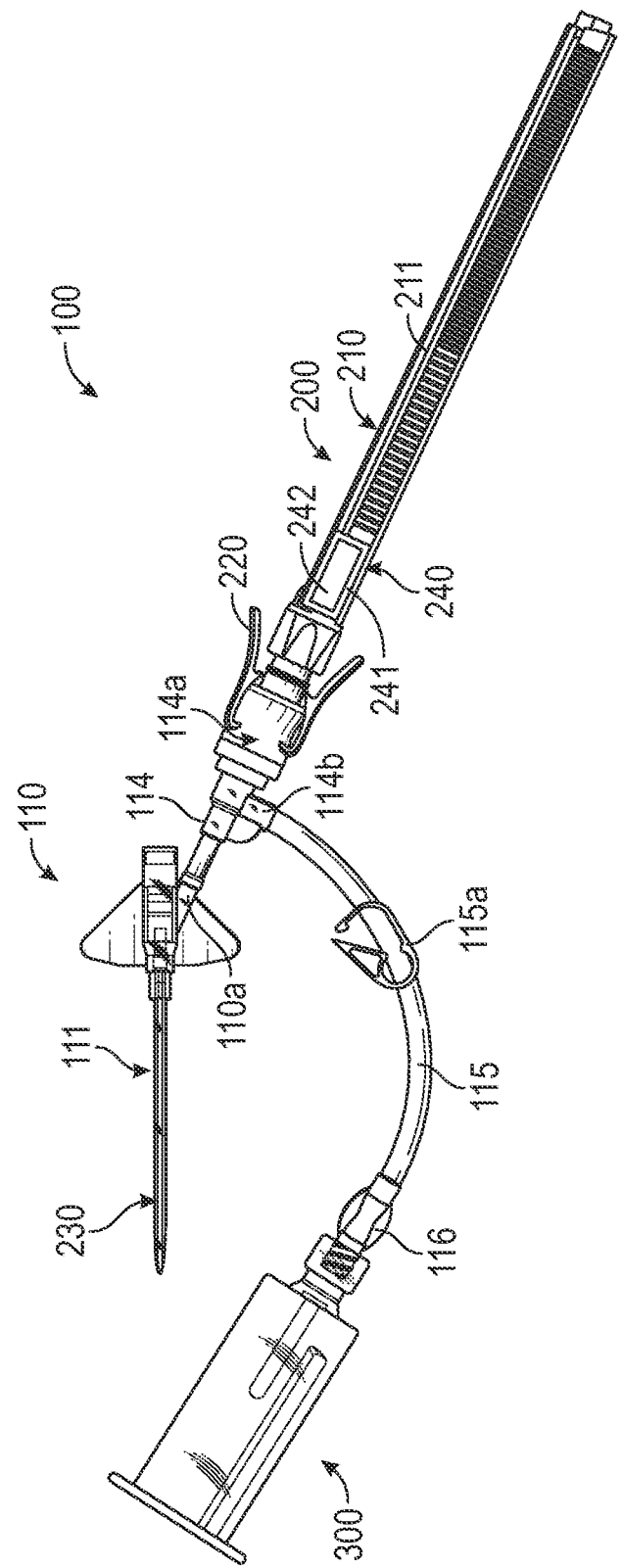
FIG. 1 provides an example of an IV catheter device that includes a guidewire assembly configured in accordance with the present invention.

FIG. 1 provides an example of an IV catheter device 100 that is configured in accordance with some embodiments of the present disclosure. IV catheter device 100 includes a catheter adapter 110 from which a catheter 111 extends distally. Although not illustrated, a needle assembly may oftentimes be secured to catheter adapter 110 and may be employed to insert catheter 111 into a patient's vasculature and subsequently detached from catheter adapter 110. IV catheter device 100 also includes an adapter 114 that is connected to a side port 110a of catheter adapter 110.

IV catheter device 100 also includes a guidewire assembly 200 having a guidewire housing 210 which may house a guidewire 230 at least when guidewire 230 is not extended through catheter 111. A connector 220 may be formed at a distal end of guidewire housing 210 and may function to connect guidewire assembly 200 to IV catheter device 100 (e.g., via a port 114a of adapter 114 as illustrated in FIG. 1). In other embodiments, however, guidewire housing 210 may be integrated into adapter 114 or another component of catheter adapter 110. In other words, how a guidewire assembly is connected to a catheter adapter is not essential to embodiments of the present disclosure.

Guidewire assembly 200 may also include a guidewire actuator 240 that extends out from guidewire housing 210 and slides along a channel 211 formed in guidewire housing 210. Guidewire actuator 240 allows a clinician to move guidewire 230 relative to catheter 111 by sliding guidewire actuator 240 along the length of guidewire housing 210 within channel 211. As described in detail below, a guidewire assembly configured in accordance with embodiments of the present disclosure may include a guidewire that may be actively repositioned via a guidewire actuator to thereby reposition the tip of a catheter through which the guidewire extends. In some embodiments, such as the embodiments represented in FIG. 1, guidewire actuator 240 may include a main body 241 and one or more tabs 242 by which guidewire 230 may be actively repositioned. FIG. 1 illustrates guidewire actuator 240 in its distal-most position and therefore the distal end of guidewire 230 is positioned at, near or beyond the distal opening of catheter 111.

IV catheter device 100 also includes extension tubing 115 that is coupled at one end to a port 114b of adapter 114 and includes an adapter 116 at the opposing end. A blood collection set 300 may be coupled to or integrated with adapter 116. A clamp 115a may be positioned around extension tubing 115 to selectively block the flow of fluid through the extension tubing. In contrast to what is illustrated in FIG. 1, in some embodiments, extension tubing 115 and blood collection set 300 may be coupled to the proximal end of guidewire assembly 200 to thereby allow a blood sample to be collected via guidewire assembly 200 or to allow a fluid to be injected via guidewire assembly 200.

A guidewire assembly configured in accordance with embodiments of the present disclosure may be used to move the catheter tip to thereby remove an occlusion that may have formed around the distal opening of the catheter and/or to reposition the catheter tip such as when its distal opening may be occluded by a vessel wall or other vasculature structure. For example, after inserting catheter 111 into the patient's vasculature but prior to advancing and/or repositioning guidewire 230 in catheter 111, a thrombus could form around or proximate to catheter 111's opening and prevent blood or fluid from flowing through catheter 111. In such a case, guidewire actuator 240 could be moved into the distal-most position to advance guidewire 230 near, to or beyond the distal tip of catheter 111 (if not already in this distal position). Tab(s) 242 could then be manipulated to move guidewire 230 and thereby move catheter 111 to remove any occlusion or blockage that may be present and/or to reposition catheter 111's opening away from the thrombus or other source of occlusion (e.g., the vein wall, valve, blood clot, etc.).

Figure 2A:
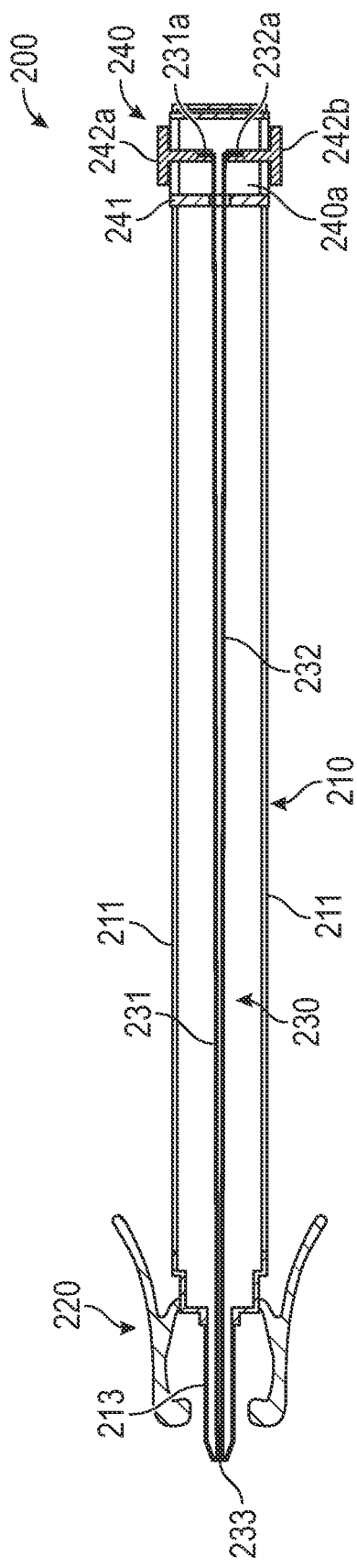
FIG. 2A is a cross-sectional view of a guidewire assembly that is configured in accordance with the present invention.
Figure 2B:
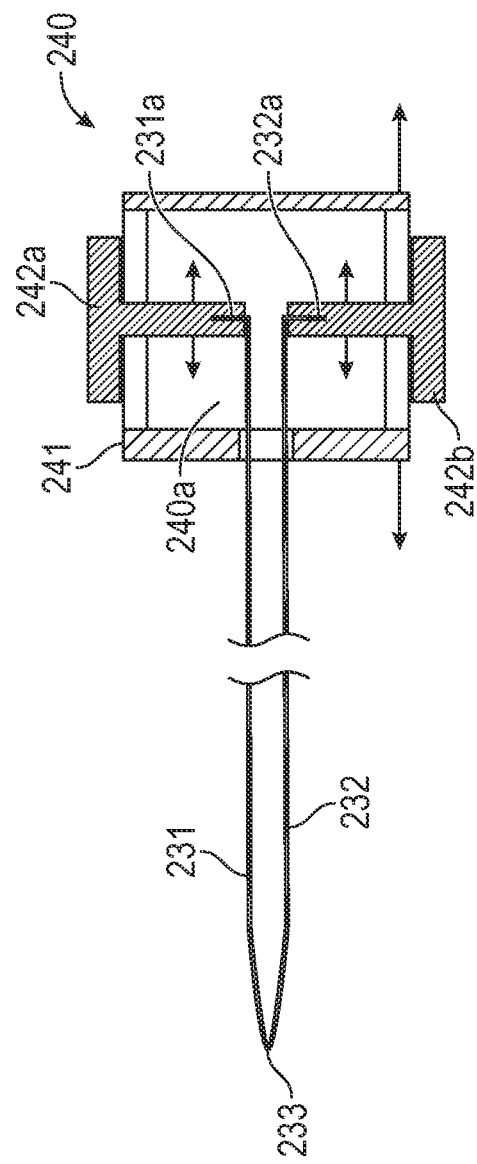
FIG. 2B is a cross-sectional view of a guidewire assembly that is configured in accordance with the present invention.

FIGS. 2A and 2B are cross-sectional views of an example implementation of guidewire assembly 200. As illustrated, guidewire assembly 200 may include guidewire housing 210 along which one or more channels 211 extend to enable guidewire actuator 240 to be slid distally and proximally along guidewire housing 210. In the depicted implementation, guidewire actuator 240 includes a main body 241 that is configured to house a first tab 242a and a second tab 242b in a slidable arrangement. Guidewire 230 may include a first segment 231 and a second segment 232 having distal ends that are connected together to form distal end 233 of guidewire 230. A proximal end 231a of first segment 231 may be coupled to first tab 242a and a proximal end 232a of second segment 232 may be coupled to second tab 242b. Accordingly, as first tab 242a and second tab 242b move relative to one another, first segment 231 and second segment 232 will also move relative to one another. More particularly, because the distal ends of first segment 231 and second segment 232 are fixed at distal end 233, relative movement between proximal ends 231a and 232a will cause distal end 233 to reposition. With distal end 233 positioned in, at or near the distal opening of catheter 111, the repositioning of distal end 233 will move catheter 111. In some embodiments, guidewire 230 may extend through a fluid seal 214 that is positioned within guidewire housing 240.

Figure 3A:
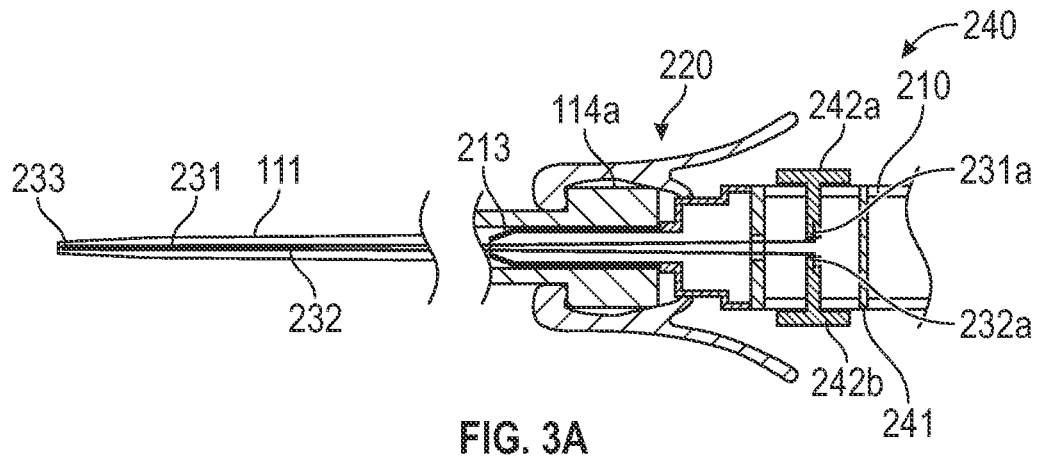
FIG. 3A is a cross-sectional view of a guidewire assembly in a first position, illustrating how the catheter tip may be actively repositioned in accordance with the present invention.
Figure 3B:
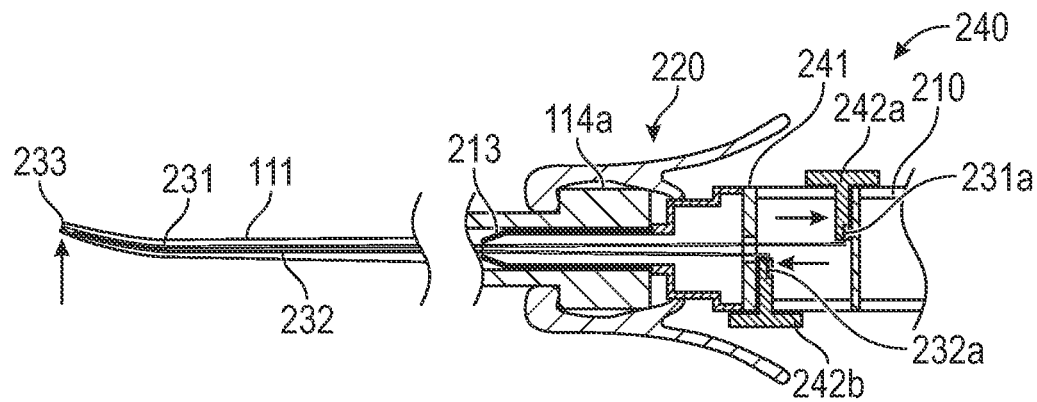
FIG. 3B is a cross-sectional view of a guidewire assembly in a second position, illustrating how the catheter tip may be actively repositioned in accordance with the present invention.
Figure 3C:
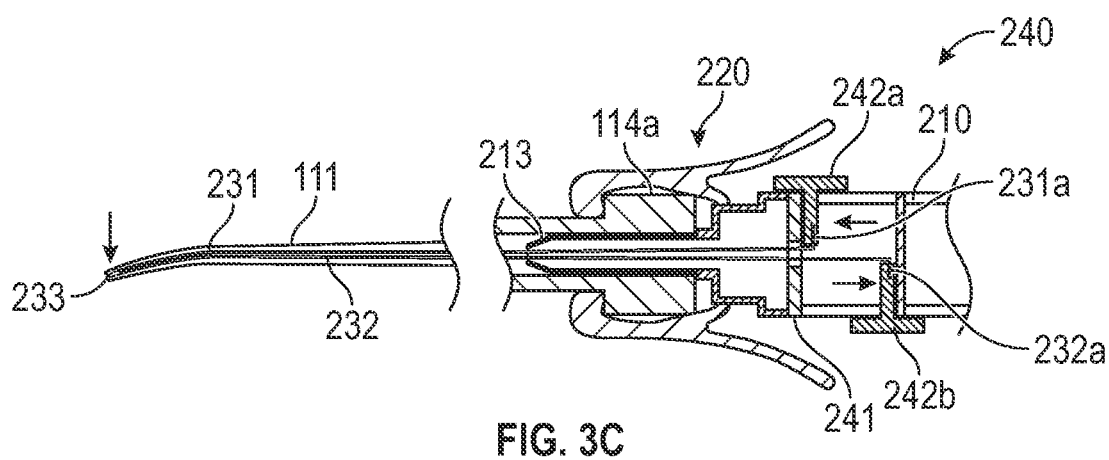
FIG. 3C is a cross-sectional view of a guidewire assembly in a third position, illustrating how the catheter tip may be actively repositioned in accordance with the present invention.
Figure 4A:
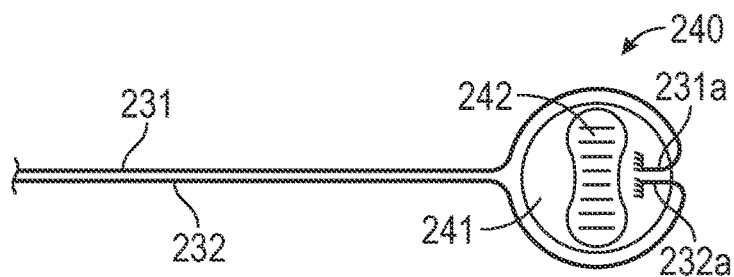
FIG. 4A is a schematic representation of a guidewire assembly in a first position in accordance with the present invention.
Figure 4B:
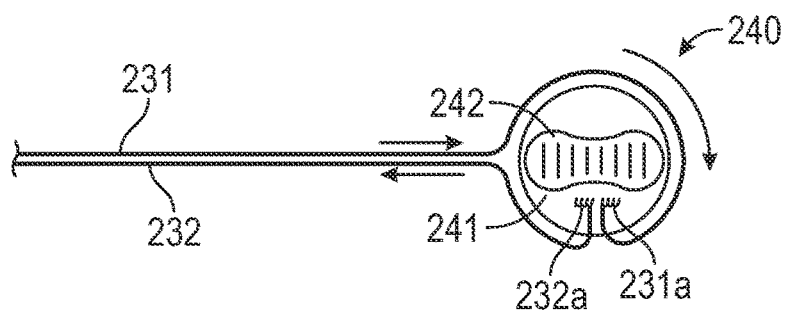
FIG. 4B is a schematic representation of a guidewire assembly in a second position in accordance with the present invention.
Figure 4C:
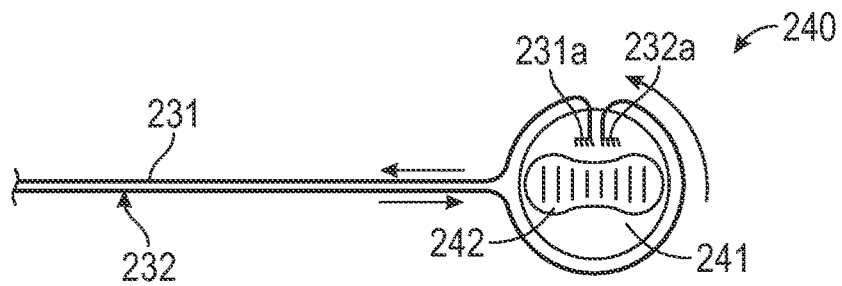
FIG. 4C is a schematic representation of a guidewire assembly in a third position in accordance with the present invention.
Figure 4D:
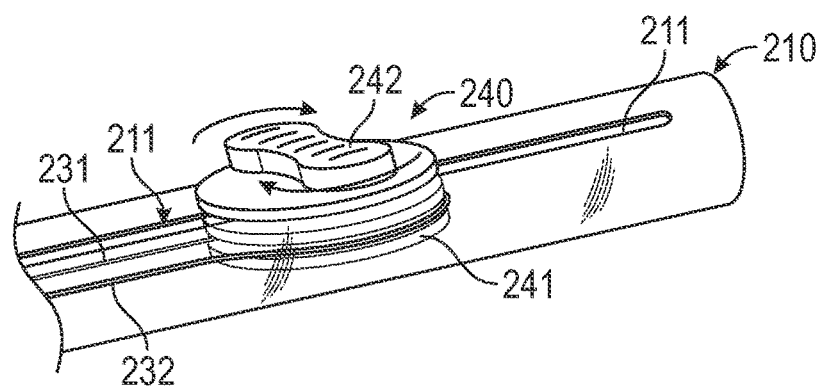
FIG. 4D is a partial perspective view of a guidewire assembly in accordance with the present invention.

FIGS. 3A-3C illustrate how guidewire actuator 240 may be manipulated to reposition distal end 233 and thereby reposition the tip of catheter 111. In FIG. 3A, first tab 242a and second tab 242b are positioned in alignment. Therefore, assuming first and second segments 231 and 232 have substantially the same length, guidewire 230 may be substantially straight. In contrast, in FIG. 3B, first tab 242a is moved to the right and second tab 242b is moved to the left. As a result, first segment 231 is moved to the right relative to second segment 232 thereby causing guidewire 230 to curve upwardly at distal end 233. Similarly, in FIG. 3C, first tab 242a is moved to the left and second tab 242b is moved to the right. As a result, first segment 231 is moved to the left relative to second segment 232 thereby causing guidewire 230 to curve downwardly at distal end 233. The degree of this curvature may be dependent on the degree to which first and second tabs 242a and 242b are moved relative to one another. Notably, this active repositioning of distal end 233 may be caused by moving only one of first tab 242a or second 242b (i.e., a clinician may reposition the tip of catheter 111 by causing relative movement between first tab 242a and second tab 242b). Also, in some embodiments, guidewire actuator 240 may be configured to rotate to cause this curvature to occur along different planes (e.g., to the right or left).

Figure 2C:
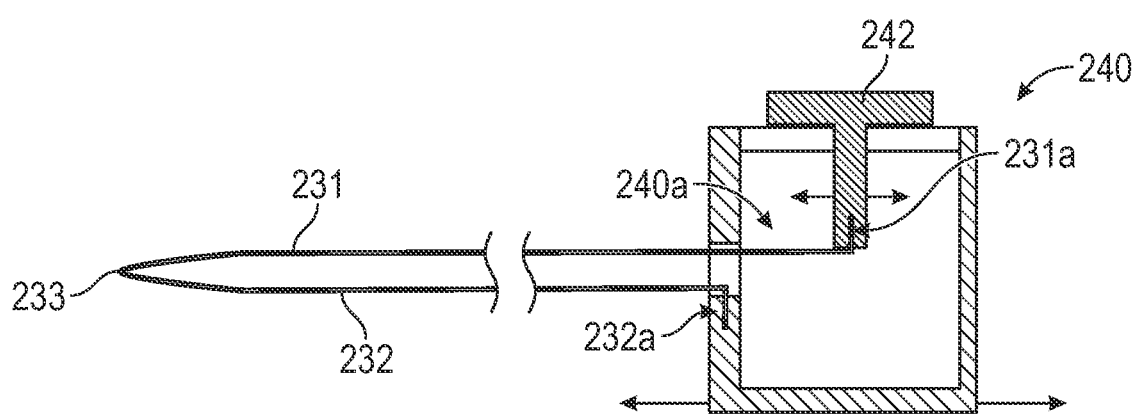
FIG. 2C is a cross-sectional view of a variation of the guidewire assembly as shown in FIG. 2A.

FIG. 2C illustrates a variation of guidewire assembly 200 illustrated in FIGS. 2A and 2B. In this variation, guidewire actuator 240 includes a single tab 242 to which proximal end 231a of first segment 231 is coupled. Proximal end 232a of second segment 232 is fixed to main body 241. Accordingly, FIG. 2C represents embodiments where the proximal end of only one of first and second segments 231 and 232 moves to cause distal end 233 to reposition.

In some embodiments, first segment 231 and second segment 232 may be part of the same wire. For example, distal end 233 may be a bend in a single wire. In other embodiments, first segment 231 and second segment 232 may be different wires that are joined together at distal end 233 or at another location. The wire or wires from which guidewire 230 is formed could be made from a variety of materials including, for example, stainless steel, nickel titanium alloys or polymers such as nylon, polytetrafluoroethylene (PTFE) and polyetherimide. In some embodiments, the wire or wires may be formed of a core material with a coating such as a metal core with a polymeric coating. In some embodiments, first and second segments 231 and 232 may be substantially straight. In some embodiments, first and second segments 231 and 232 could include a bend towards distal end 233. In some embodiments, first segment 231 could be a core wire while second segment 232 could be a coil that wraps around first segment 231. In some embodiments, distal end 233 could be in the form of or include a dome shape. Accordingly, guidewire 230 may take a variety of forms and include a variety of features in embodiments of the present disclosure.

FIGS. 4A-4D provide another example of a guidewire assembly 200 that is configured in accordance with one or more embodiments. In this example, guidewire actuator 240 includes a main body 241 that has a round shape and a tab 242 that may be used to rotate main body 241. First and second segments 231 and 232 extend around main body 241 in opposite directions with proximal ends 231a and 232a being fixed to main body 241. Accordingly, when main body 241 is rotated, first and second segments 231 and 232 will move in opposite directions thereby causing distal end 233 to reposition. FIG. 3D illustrates that, in addition to this rotation, guidewire assembly 240 may slide within channel 211 to position distal end 233 near, at or beyond the tip of catheter 111.

Figure 5A:
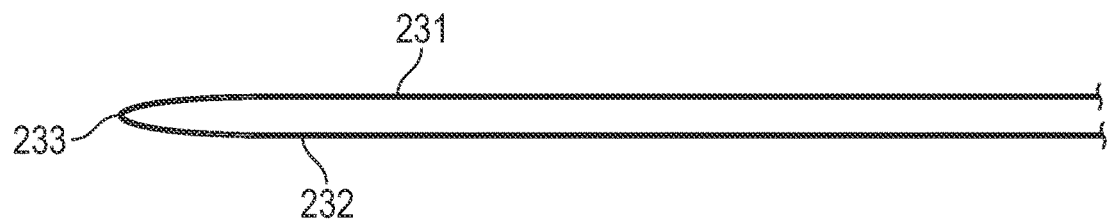
FIG. 5A is a schematic side view of a guidewire in accordance with the present invention.
Figure 5B:
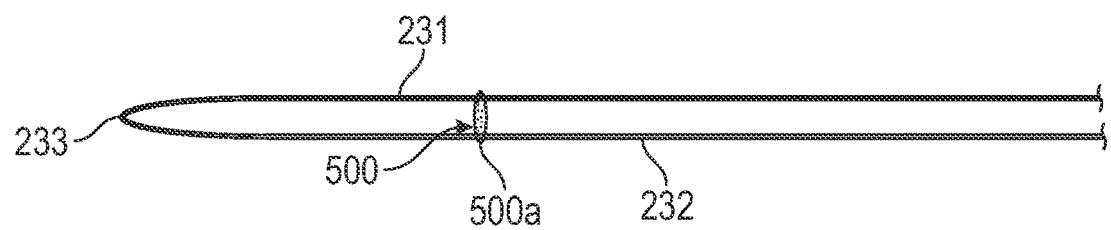
FIG. 5B is a schematic side view of a guidewire in accordance with the present invention.

FIGS. 5A-5E each provide an example of how guidewire 230 could be configured in one or more embodiments. In FIG. 5A, first segment 231 and second segment 232 are formed from a single wire that is bent at distal end 233. In FIG. 5B, first segment 231 and second segment 232 are also formed of a single wire that is bent at distal end 233 but guidewire 230 also includes a ring 500 (or other coupling element). Ring 500 may be secured to second segment 232 and may also wrap around first segment 231. For example, a weld 500a or other bonding technique could be employed to secure ring 500 at a fixed point of second segment 232. Ring 500 may function to retain the proximity of first segment 231 to second segment 232 when distal end 233 is repositioned. For example, if first segment 231 is pulled to the right relative to second segment 232, ring 500 may function to create a pivot point at which the distal portions of first and second segments 231 and 232 may pivot upwardly. In contrast, without ring 500, first segment 231 may tend to arch away from second segment 232 thereby minimizing the movement of distal end 233.

Figure 5C:
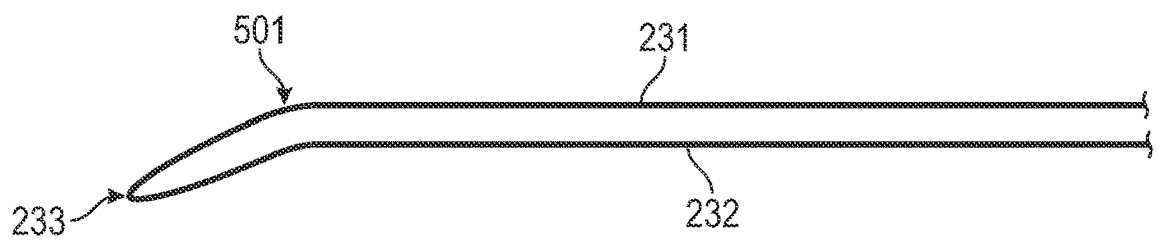
FIG. 5C is a schematic side view of a guidewire in accordance with the present invention.
Figure 5D:
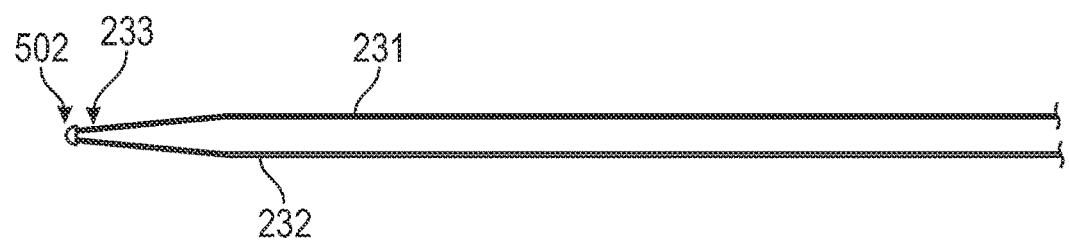
FIG. 5D is a schematic side view of a guidewire in accordance with the present invention.
Figure 5E:
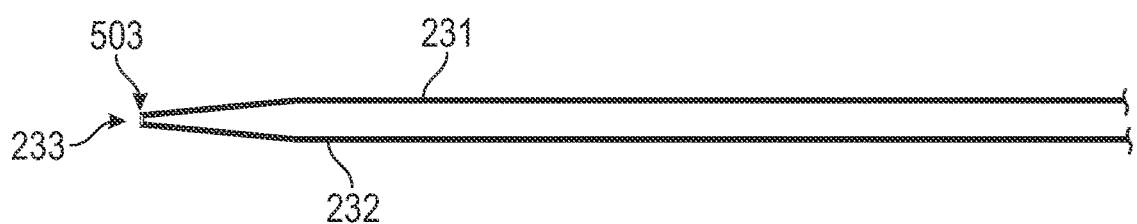
FIG. 5E is a schematic side view of a guidewire in accordance with the present invention.
Figure 7C:
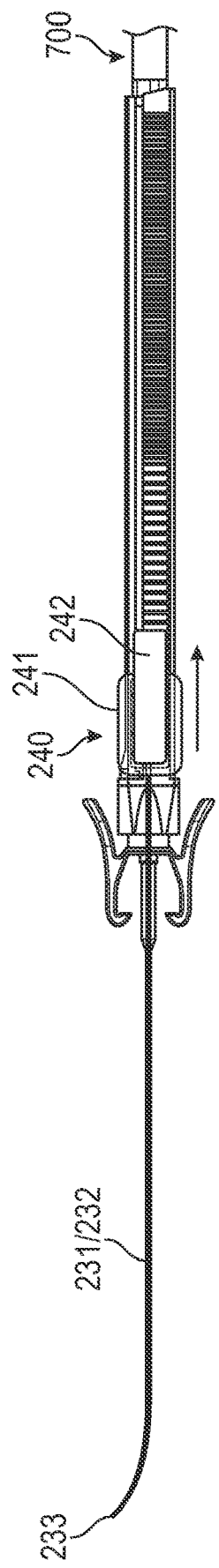
FIG. 7C is a partial side view of a guidewire assembly that is configured in accordance with the present invention.
Figure 7D:
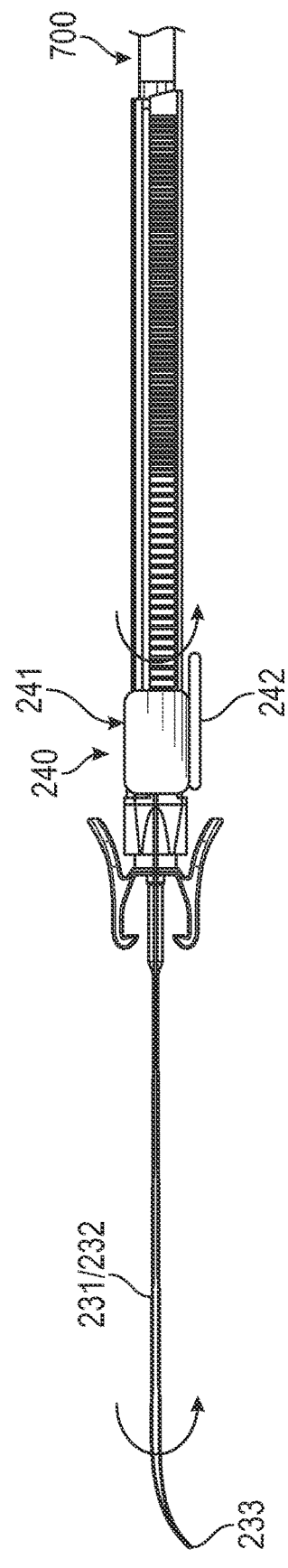
FIG. 7D is a partial side view of a guidewire assembly that is configured in accordance with the present invention.

FIG. 5C provides an example where a bend 501 is formed in first and second segments 231 and 232 towards distal end 233. Bend 501 may be formed independent of the manipulation of guidewire actuator 240. In other words, guidewire 233 may form bend 501 as a default orientation. FIG. 5D provides an example where a dome 502 or other rounded shape is formed at distal end 233. Dome 502 may minimize the potential of harm to the vasculature when guidewire 230 is extended from catheter 111. FIG. 5E provides an example where first segment 231 and second segment 232 are formed of two separate wires that are joined together. In the depicted example, a weld 503 or other coupling technique or structure is formed at distal end 233. However, multiple wires could be joined together at any other location to form guidewire 230. The examples provided in FIGS. 5A-5E should not be viewed as mutually exclusive.

FIGS. 6A and 6B illustrate another example configuration of guidewire assembly 200 on IV catheter device 100. In this example configuration, guidewire actuator 240 includes first tab 242a and second tab 242b and are slidably coupled to opposing sides of main body 241. Additionally, main body 241 (or at least first and second tabs 242a and 242b) are configured to rotate relative to guidewire housing 210. For example, in FIG. 6B, guidewire actuator 240 has been rotated 90 degrees relative to its position in FIG. 6A and this rotation has caused guidewire 230 to reposition the tip of catheter 111 even without any sliding movement of first and second tabs 242a and 242b.

FIGS. 6A and 6B also represent embodiments where guidewire assembly 200 is coupled to an inline port 110b of catheter adapter 110. A septum 610 may be positioned within inline port 110b, and, in such cases, guidewire 230 may pass through septum 610.

FIGS. 7A-7D illustrate another example configuration of guidewire assembly 200 in isolation. In comparison to FIG. 1, guidewire assembly 200 in these figures includes extension tubing 700 that extends from the proximal end of guidewire housing 210. Although not illustrated, blood collection set 300 or another fluid capture or fluid injection set could be coupled to extension tubing 700 to thereby allow a blood sample to be collected or fluid to be injected via guidewire assembly 200. In other words, guidewire housing 210 may form a fluid pathway. FIGS. 7A-7D also illustrate how guidewire 230 may be manipulated by sliding guidewire actuator 240 along guidewire housing 210, sliding tab 242 relative to main body 241 and rotating guidewire actuator 240 relative to guidewire housing 210.

Figure 8A:
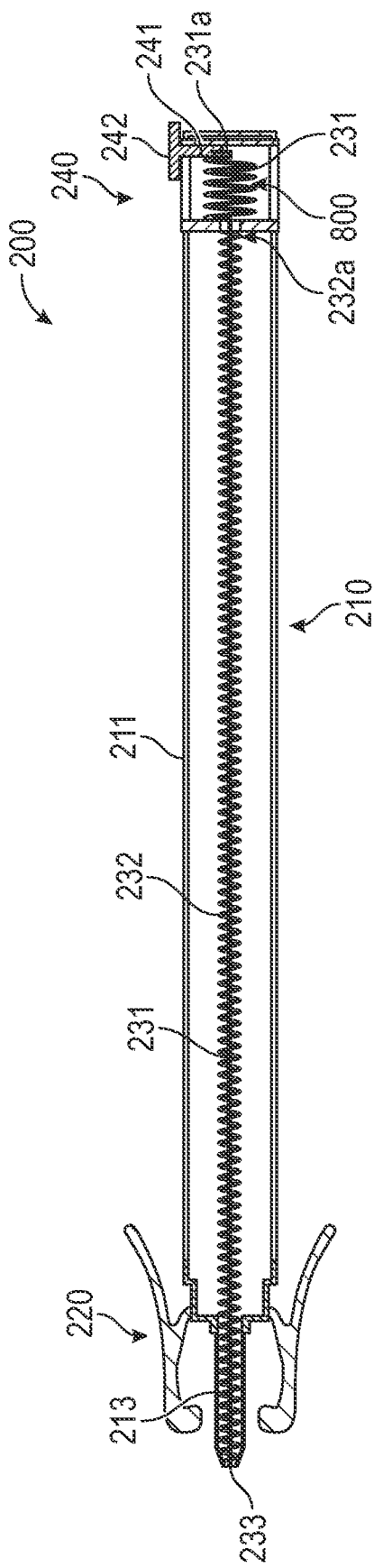
FIG. 8A is a partial side view of a guidewire assembly that is configured in accordance with the present invention.
Figure 8B:
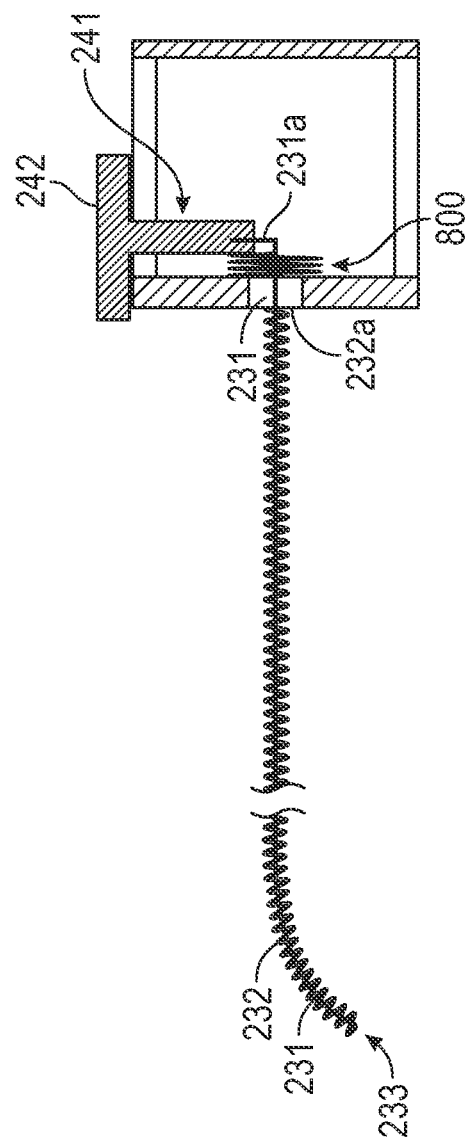
FIG. 8B is a partial side view of a guidewire assembly that is configured in accordance with the present invention.

FIGS. 8A and 8B illustrate another example configuration of guidewire assembly 200. In this example configuration, first segment 231 is in the form of a core wire and second segment 232 is in the form of a coil that extends around the core wire. Proximal end 231a of first segment 231 may be secured to tab 242 while proximal end 232a of second segment 232 may be fixed to main body 241. In such embodiments, guidewire actuator 240 may include a spring 800 that biases tab 242 into a proximal position relative to main body 241. In some embodiments, guidewire 230 could be configured to be substantially straight when tab 242 is in this proximal position. In contrast, when tab 242 is slid distally, guidewire 230 may be repositioned as illustrated in FIG. 8B. Alternatively, guidewire 230 could be in a curved position when tab 242 is in the proximal position and could be straightened when tab 242 is moved into the distal position. In any case, the distal movement of tab 242 relative to main housing 241 may cause distal end 233 of guidewire 230 to reposition. Spring 800 may cause tab 242 to return to the proximal position absent an external force. It is noted that a guidewire formed by a core wire and a coil could be used in any of the guidewire assemblies described herein and need not be limited to the embodiment illustrated in FIGS. 8A and 8B. In particular, a guidewire formed by a core wire and a coil need not be used with spring 800.

In a variation of the embodiments represented in FIGS. 8A and 8B, spring 800 could be removed and proximal end 232a of second segment 232 could extend to tab 242. In other words, the coil that second segment 232 forms could be coupled to and therefore move with tab 242. In such embodiments, main body 241 could be configured to apply a compressive force against second segment 232 (or otherwise retain it) at the point where second segment 232 passes through main body 241 to thereby cause the portion of second segment 232 contained within main body 241 to compress when tab 242 is moved distally. The compression of this portion of second segment 232 will cause tab 242 to spring back proximally once the distal force is no longer applied to tab 242. Accordingly, in such embodiments, the portion of second segment 232 contained within main body 241 functions in a manner similar to spring 800. In these embodiments, the repositioning of guidewire 230 can occur in substantially the same manner as represented in FIGS. 8A and 8B given that main body 241 will anchor second segment 232 in place while first segment 231 moves distally.

In another similar variation, proximal end 232a of second segment 232 could also extend to tab 242 and main body 241 could also be configured to apply a compressive force against second segment 232 (or otherwise retain it) at the point where second segment 232 passes through main body 241. However, in contrast to the previously described variation, tab 242 can be configured to slide proximally to reposition guidewire 230. In other words, a proximal force can be applied to tab 242 to pull distal end 233 of guidewire 230 proximally. Due to the compressive force on second segment 232, the portion of second segment 232 that is positioned between tab 242 and the point where the compressive force is applied will stretch when tab 242 is slid proximally. Then when the proximal force is no longer applied to tab 242, this portion of second segment 232 will return to its un-stretched position. In short, in these variations, an intermediary point of the coil-shaped second segment 232 can be held in place as first segment 231 is moved distally or proximally to thereby cause distal end 233 to move off axis.

FIGS. 9A and 9B each illustrate another example configuration of guidewire assembly 200. In each of these examples, guidewire assembly 200 is integrated into catheter adapter 110. In other words, a portion of catheter adapter 110 is used in place of guidewire housing 210. In FIG. 9A, first tab 242a and second tab 242b are integrated into inline port 110b but otherwise function similarly as described above. In FIG. 9B, first tab 242a and second tab 242b are integrated into side port 110a but otherwise function similarly as described above. Accordingly, embodiments of the present disclosure encompass guidewire assemblies that are separate and detachable from the catheter adapter, separate but not detachable from the catheter adapter, integrated with the catheter adapter, etc.

In summary, a guidewire assembly configured in accordance with embodiments of the present disclosure may include a two segment guidewire having a distal end that may be moved off axis by relative movement between the proximal ends of the two segments. The movement of the distal end of the guidewire enables the tip of a catheter to be actively repositioned while it is positioned intravenously. The repositioning may be performed to remove an occlusion from the opening of the catheter, to move the opening of the catheter way from the vascular wall or other obstruction or to otherwise facilitate blood collection or fluid injection through the catheter. Notably, a guidewire assembly in accordance with embodiments of the present disclosure facilitate this repositioning of the catheter tip without moving or adjusting the catheter adapter or altering the insertion depth of the catheter itself. In short, embodiments of the present disclosure provide a clinician with targeted control over the position of the catheter's tip.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A guidewire assembly comprising:
   a guidewire housing;
   a guidewire actuator configured to slide within the guidewire housing; and
   a guidewire having a first segment and a second segment;
   wherein the guidewire actuator is coupled to a proximal end of the first segment and to a proximal end of the second segment such that the guidewire slides when the guidewire actuator is slid within the guidewire housing, wherein the guidewire actuator is configured to cause relative movement between the proximal end of the first segment and the proximal end of the second segment to thereby cause a distal end of the guidewire to reposition, and wherein the guidewire actuator is configured to move the guidewire between a first position where the distal end of the guidewire is received within the guidewire housing and a second position where the distal end of the guidewire extends outside of the guidewire housing.

2. The guidewire assembly of claim 1, wherein a single wire forms the first segment and the second segment.

3. The guidewire assembly of claim 1, wherein multiple wires form the first segment and the second segment.

4. The guidewire assembly of claim 1, wherein the guidewire actuator includes a first tab that is coupled to the proximal end of the first segment, and wherein the first tab moves relative to a main body of the guidewire actuator to cause the relative movement between the proximal end of the first segment and the proximal end of the second segment.

5. The guidewire assembly of claim 4, wherein the first tab moves relative to the main body by sliding along the main body.

6. The guidewire assembly of claim 4, wherein the guidewire actuator includes a second tab that is coupled to the proximal end of the second segment, and wherein the second tab moves relative to the main body of the guidewire actuator to cause the relative movement between the proximal end of the first segment and the proximal end of the second segment.

7. The guidewire assembly of claim 6, wherein the first tab and the second tab move relative to the main body by sliding along the main body.

8. The guidewire assembly of claim 1, wherein the guidewire actuator includes a main body and the proximal end of the first segment and the proximal end of the second segment are coupled to the main body, and wherein the main body rotates to cause the relative movement between the proximal end of the first segment and the proximal end of the second segment.

9. The guidewire assembly of claim 8, wherein the first segment and the second segment are wrapped around the main body in opposite directions.

10. The guidewire assembly of claim 1, wherein the guidewire further comprises one or more of:
- a ring that maintains a spacing between the first and second segments;
- a bend that is spaced from the distal end; or
- a dome-shaped distal end.

11. The guidewire assembly of claim 1, wherein the first segment is a core wire and the second segment is a coil that extends around the core wire.

12. The guidewire assembly of claim 11, wherein the proximal end of the first segment is coupled to a tab of the guidewire actuator, and wherein the guidewire actuator further includes a spring that biases the tab in a proximal direction.

\* \* \* \* \*